United States Patent [19]

Komurasaki et al.

[11] Patent Number: 4,689,545
[45] Date of Patent: Aug. 25, 1987

[54] CONTROL APPARATUS FOR VEHICLE BATTERY CHARGING GENERATOR

[75] Inventors: Keiichi Komurasaki; Hifumi Wada; Shinji Nishimura, all of Himeji, Japan

[73] Assignee: Mitsubishi Denki Kabushiki Kaisha, Tokyo, Japan

[21] Appl. No.: 833,242

[22] Filed: Feb. 26, 1986

[30] Foreign Application Priority Data

Mar. 4, 1985 [JP] Japan .................................. 60-43966
Mar. 4, 1985 [JP] Japan .................................. 60-43967

[51] Int. Cl.⁴ ............................................. H02J 7/14
[52] U.S. Cl. ........................................ 322/14; 320/64;
322/28; 322/73
[58] Field of Search ...................... 322/28, 10, 73, 14,
322/15; 320/64, 62, 32

[56] References Cited

U.S. PATENT DOCUMENTS 4,263,543  4/1981  Watrous et al. .................. 320/64 X
4,308,492 12/1981  Mori et al. ............................ 320/32
4,310,793  1/1982  Sheldrake et al. .................... 322/28
4,384,245  5/1983  Metter .............................. 320/64 X
4,612,493  9/1986  Katashima et al. .................... 320/64

FOREIGN PATENT DOCUMENTS

2495384   6/1982  France ................................ 320/62
59-99939   6/1984  Japan .
59-213239 12/1984  Japan .

Primary Examiner—R. J. Hickey
Attorney, Agent, or Firm—Leydig, Voit & Mayer

[57] ABSTRACT

A control apparatus for a battery charging generator for use in a vehicle in which a voltage regulator for regulating the output of the generator is controlled by a reference voltage generating unit in response to a signal representing acceleration (an operating state) for gradually changing the output voltage of the generator until the output voltage is below the battery terminal voltage so that the vehicle's engine runs smoother and changes of intensity in a lighting device included in the load occur gradually and are not visually noticeable.

6 Claims, 6 Drawing Figures

CONTROL APPARATUS FOR VEHICLE BATTERY CHARGING GENERATOR

BACKGROUND OF THE INVENTION

The present invention relates generally to a charging generator control apparatus for a vehicle, and more particularly to a control apparatus for a vehicle battery charging generator adapted to control field current flowing through a field coil of the charging generator, thereby regulating the output voltage to be supplied to the battery and an electric load.

Figure 1:
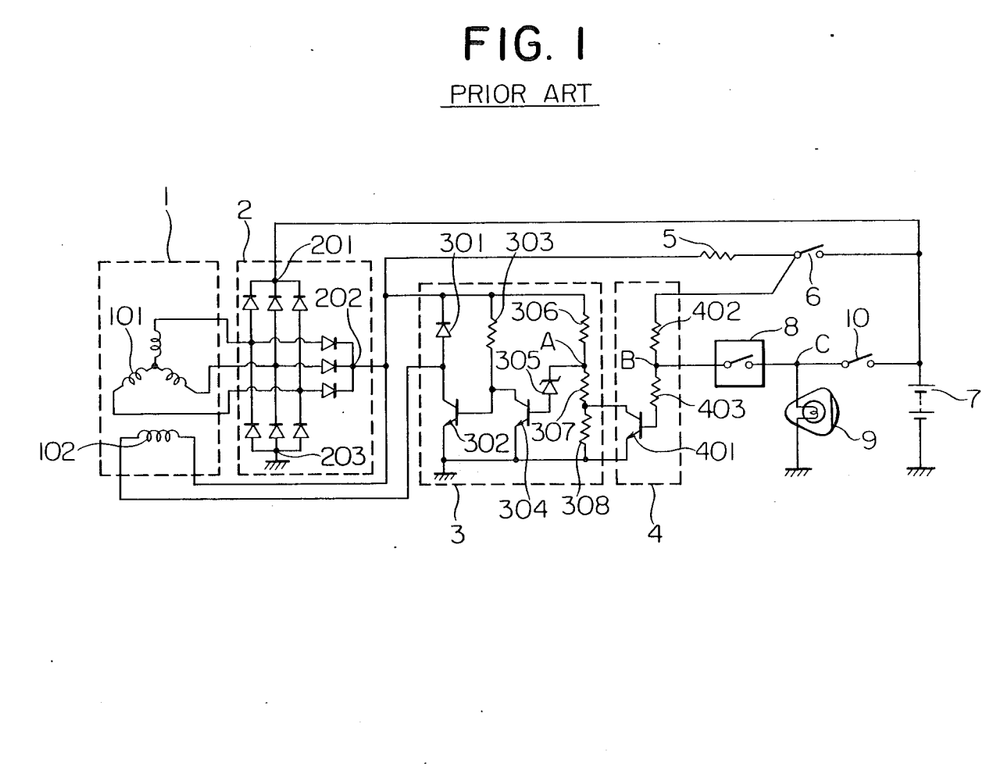
FIG. 1 is a circuit diagram showing a control apparatus for a conventional vehicle battery charging generator.

To facilitate the understanding of the present invention, reference is made to FIG 1 which is a circuit diagram, disclosed in Japanese Patent Laid-Open Application No. 59-9949/1984, showing a typical example of a conventional control apparatus for a charging generator for use in a vehicle. Referring to FIG. 1, there is shown an alternating current generator 1, having armature coils 101 and a field coil 102 and driven by an engine (not shown) to produce a three-phase AC voltage. There is also shown a rectifier 2 which carries out the full-wave rectification for the three-phase AC voltage from the generator 1, and provides a rectified output current at its output terminals 201, 202 and 203. It is seen that the field current flowing through the field coil 102 of the generator 1 is controlled by way of a voltage regulator 3 in such a manner that after the generator 1 has started, the output voltage of the generator 1 may be controlled to a predetermined level by the voltage regulator 3.

The voltage regulator 3 includes a diode 301 for absorbing a surge voltage and a power transistor 302 connected in series to the diode 301 and ground. The field coil 102 is connected to the output terminal 202 of the rectifier 2 and across the diode 301. The power transistor 302 is employed in the circuit of the voltage regulator 3 to repeatedly interrupt the flow of field current in the coil 102 and includes a base connected to the collector of the transistor 304 and also to the output terminal 202 through a base resistor 303. The emitter of the transistor 304 is grounded together with the emitter of the power transistor 302, and the base of the transistor 304 is connected to a common node A of resistors 306 and 307 through a zener diode 305. The transistor 304 is adapted in the circuit to repeatedly interrupt the current flowing through the power transistor 302, and the zener diode 305 is adapted to detect the output voltage of the rectifier 2, and is turned on when this output voltage exceeds a predetermined value.

There is also shown a series circuit consisting of resistors 306-308 between the output terminal 202 and ground. These resistors 306-308 form a voltage divider to divide the output voltage at the output terminal 202 of the rectifier 2.

A determining voltage regulating circuit 4 includes a transistor 401 having its collector and emitter connected in parallel with the resistor 308 of the voltage regulator and a series combination of resistors 402 and 403 connected to a movable contact of a key switch 6.

The node B between the resistors 402 and 403 is connected through an acceleration switch 8 and a light switch 10 to the positive electrode of a storage battery 7. The negative electrode of the battery 7 is grounded.

The acceleration switch 8 comprises a switch which is connected to, for example, an appropriate pressure responsive means (not shown). The node C between the acceleration switch 8 and the light switch 10 is grounded through a lighting device 9. This lighting device 9 can be lit by closing the light switch 10. The positive electrode of the battery 7 is also connected to the output terminal 201 of the rectifier 2, and to the output terminal 202 through the key switch 6 and a resistor 5.

In operation, when the key switch 6 is closed, a field current for the field coil 102 is produced from the battery 7 and flows through the key switch 6, resistor 5, the field coil 102 and the power transistor 302. This initial field current excites the armature coils 101 and prepares the generator 1 for its power generating operation.

At the same time, the voltage of the battery 7 is also applied to the determining voltage regulating circuit 4 through the key switch 6. With this operation, the transistor 401 is now made conductive, thus short-circuiting the resistor 308.

Under this normal (steady) state of operation of the circuit, a current potential at node A as a voltage detection point of the voltage regulator 3 may be determined from the divided voltage in the voltage divider circuit consisting of resistors 306 and 307.

Next, when the engine of a vehicle (not shown) starts and the generator 1 is driven, the generator 1 generates electric power, and the voltage regulator 3 operates to control the output voltage of the generator 1 to a predetermined regulated voltage. Therefore, the generator 1 supplies the battery 7 and other electric loads (not shown) with the thus-regulated output voltage.

With such an arrangement of the control apparatus for the vehicle battery charging generator as noted above, when the acceleration switch 8 is closed as the vehicle is accelerated, the node B of the determining voltage regulating circuit 4 is then grounded by way of the acceleration switch 8 and the filament of the lighting device 9 and so is dropped in potential.

As a consequence, the transistor 401 is then switched off, and the resistor 308 is released from its short-circuit state. Then, a voltage divider circuit consisting of the resistor 306 and the resistors 307 and 308 is formed for the voltage detection by the voltage regulator 3, thus increasing the potential at the node A.

Under this condition, the zener diode 305 and the transistor 304 become conductive while the power transistor 302 is not conductive, so that the field ccurrent is interrupted and thus the generator 1 stops its power generation. This serves to remove the driving torque of the generator 1 from the engine's load, thereby enhancing the acceleration performance of the vehicle.

Next, when the acceleration operation is absent and the acceleration switch 8 is opened, the potential at the node B of the determining voltage regulating circuit 4 will increase and the transistor 401 will again become conductive, thus short-circuiting the resistor 308. Therefore, the voltage regulator 3 again returns again to the normal state of operation of the vehicle as stated above.

Now, referring to a state in which the lighting device 9 is operating, i.e., the light switch 10 is closed so that the potential at the node C is equal to the voltage of the battery 7, when the vehicle is accelerated and the acceleration switch 8 is closed, the node B of the determining voltage regulating circuit 4 becomes equal in potential to the node C, thus being applied with the battery voltage. Under such a condition, since the transistor 401 maintains its conductive state to short-circuit the resistor 308, the voltage regulator 3 continues its normal operation, thus causing the generator 1 to be in the power generation operation mode of operation without any interruption.

In this manner, even when the vehicle is accelerating while the lighting device 9 is lit, there is no interruption of the power generating operation on the part of the generator 1, which thus prevents the lighting device 9 from changing quickly in its intensity of illumination.

With this construction of the control apparatus for the conventional charging generator for use in a vehicle, while the lighting device 9 is lit, the driving torque of the generator 1 is continuously imposed as a load on the vehicle's engine because the generator 1 does not cease its power generating operation even during the acceleration mode of the vehicle in order to prevent the intensity of illumination of the lighting device 9 from rapidly changing. Furthermore, while the lighting device 9 is not lit in the acceleration mode, since the generator 1 rapidly and repeatedly stops and starts the power generation, the driving torque of the generator 1 which forms a load on the engine is rapidly changed causing an even engine rotation On the other hand, Japanese Patent Application Laid-open No. 59-99939 discloses a vehicle battery charging generator control apparatus in which the power generation of the generator is stopped during the acceleration time of the vehicle but is not stopped while a lighting device is on.

SUMMARY OF THE INVENTION

It is an object of the present invention to provide a control apparatus for a vehicle battery charging generator which gradually reduces the output voltage of the charging generator and also removes torque required for driving the generator from the engine upon the occurrence of an operating state, such as acceleration of the engine, whereby the intensity of illumination of a lighting device of the vehicle does not change abruptly and the change is less noticeable and smooth rotation of the engine is obtained.

The object of the invention is attained by the provision of a reference voltage generating unit which gradually changes a reference voltage supplied to a voltage regulator connected to the generator.

BRIEF DESCRIPTION OF THE DRAWINGS

The invention will be further understood from the following description of preferred embodiments thereof when read in conjunction with the accompanying drawings, in which like parts are designated by like reference numerals, and in which.

DETAILED DESCRIPTION OF THE PREFERRED EMBODIMENTS

Before explaining the preferred embodiments of the invention in detail, it is to be understood that the invention is not limited in its application to the details of construction and arrangement of components as set forth in the following description or illustrated in the drawings. The invention can be practiced in various ways. Also, it is to be understood that the words and phrases as employed herein are merely for the purpose of description and should not be taken as restrictions in any way.

Figures 2, 3:
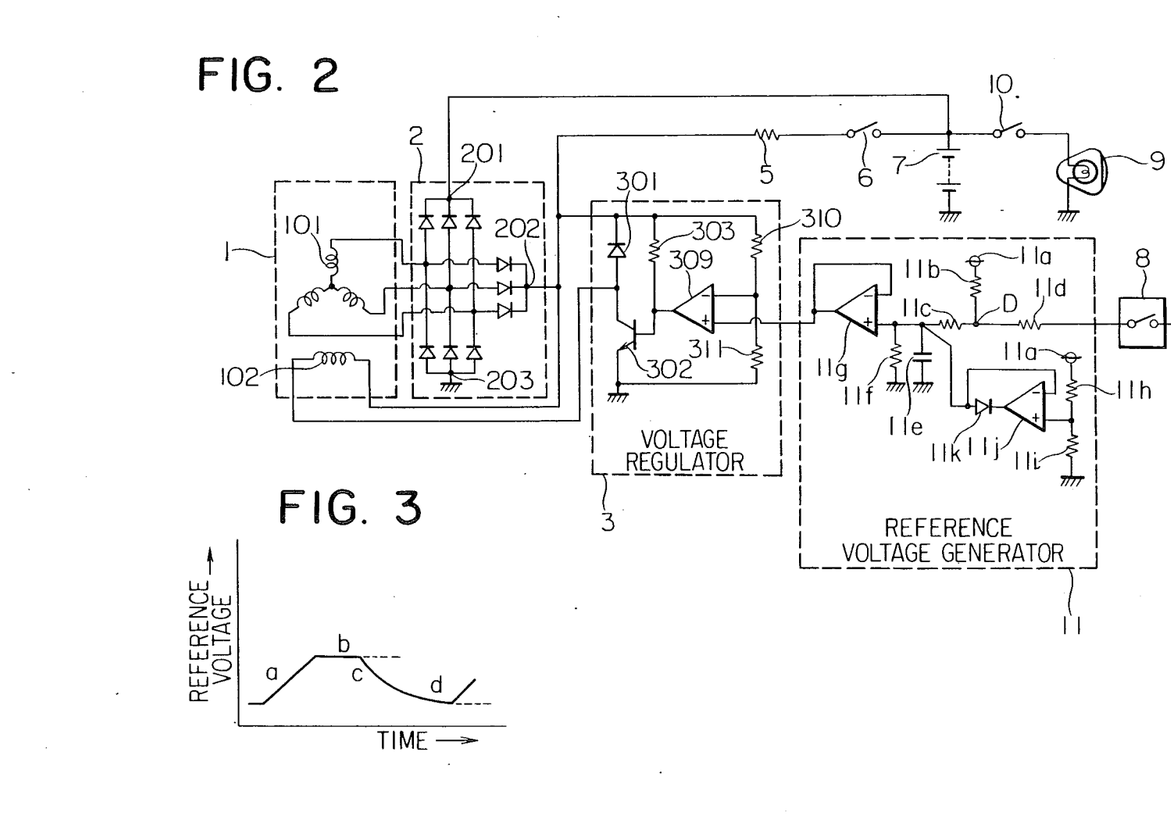
FIG. 2 is a circuit diagram showing a preferred embodiment of a control apparatus for a vehicle battery charging generator according to the present invention.
FIG. 3 is a schematic graphic representation showing a reference voltage curve as attained by the control apparatus for the vehicle battery charging generator according to the present invention.

Referring firstly to FIG. 2, description will now be made mainly on parts which are different from those shown in FIG. 1. As apparent from a comparison with FIG. 1, the determining voltage regulating circuit 4 in FIG. 1 is omitted from FIG. 2, the construction of the voltage regulator 3 and the connection of the acceleration switch 8 differ from those shown in FIG. 1, and a reference voltage generating unit 11 is provided. Other details of the construction are similar to those of FIG. 1.

More specifically, a reference voltage generating means, herein shown as a reference voltage generating unit 11, is connected to a power source 11a and grounded through resistors 11b, 11c and a capacitor 11e. A common node between resistor 11c and capacitor 11e is connected to a non-inverting input terminal (+) of an operational amplifier 11g. This (+) input terminal is grounded through a resistor 11f.

The operational amplifier 11g provides at its output terminal a reference voltage value controlled by the charge and discharge voltages across capacitor 11e to be applied to the (+) input terminal of a comparator 309 in the voltage regulator 3. The inverting (−) input terminal of the operational amplifier 11g is connected to the output terminal thereof.

A common node D between the resistors 11b and 11c is grounded through a resistor 11d and the accelerating switch 8. These resistors 11b–11d serve as charging and discharging resistors for the capacitor 11e.

Also, the power source 11a is grounded through resistors 11h and 11i, with the node between these resistors 11h and 11i being connected to the (+) input terminal of an operational amplifier 11j. The output terminal of the operational amplifier 11j is connected to the common node between the resistor 11c and the capacitor 11e through a diode 11k which blocks a reverse current passing therethrough. This common node is further connected to the (−) input terminal of the operational amplifier 11j.

By the use of a voltage follower circuit formed of the resistors 1h and 11i, the operational amplifier 11j provides an output which determines an upper limit value of the charge voltage of the capacitor 11e supplied to the (+) input terminal of the operational amplifier 11g.

Referring now to the voltage regulator 3, it is seen that resistors 310, 311 and a comparator 309 are now in place of the resistors 306, 307 and the zener diode 305 shown in FIG. 1. The series circuit having resistors 310 and 311 is connected across output terminal 202 of the rectifier 2 and ground. A common node between resistors 310 and 311 is connected to the (−) input terminal of the comparator 309. The output terminal of the comparator 309 is connected to the base of power transistor 302. The remaining elements of the voltage regulator 3 are similar to those shown in FIG. 1 and, therefore, their descriptions are omitted for simplicity.

Next, the operation of the embodiment in FIG. 2 will be described with reference to FIG. 3, which illustrates a reference voltage curve obtained as an output from the reference voltage generating unit 11 when the acceleration switch 8 is turn on and off.

When the key switch 6 is closed firstly, field current is fed from the battery 7 to the field coil 102 passing through the key switch 6 resistor 5 the field coil 102 and the power transistor 302 to prepare the generator 1 for its power generating operation.

On the other hand, the reference voltage generating unit 11 is supplied with electric power from the power source terminals 11a, whereby a voltage at a level "b" shown in FIG. 3 is fed as a reference voltage value to the (+) input terminal of the comparator 309. This reference voltage "b" serves to cause the generator 1 to provide a predetermined normal output voltage.

Next, the engine of a vehicle (not shown) is started so that the generator 1 is driven to generate an output voltage. As this output voltage increases, the divided voltage by the resistors 310 and 311, that is the potential at the (−) input terminal of the comparator 309 increases, and when it exceeds level "b" of the reference voltage value, the output potential from the comparator 309 decreases. Therefore, the power transistor 302 is switched off, so that the field current is interrupted, resulting in a reduction in the output voltage of the generator 1.

Now with the reduction in the output voltage of the generator 1 as noted above, the potential at the (−) input terminal of the comparator 309 decreases, and when it becomes lower than the "b" level of the reference voltage value provided by the reference voltage generating unit 11, the output voltage from the comparator 309 increases, and then the power transistor 302 is again switched on to provide the field coil 102 with a field current and thus the output voltage of the generator 1 is increased accordingly.

With the repetition of this operation, the output voltage of the generator 1 is regulated to the predetermined normal level "b" so that the generator 1 may supply the battery 7 and other loads with a substantially constant electric power.

Next, the operation of the reference voltage generating unit 11 will be described. Firstly, the case where the reference voltage generating unit 11 is in a normal operating condition to produce a reference voltage level "b" as shown in FIG. 3 will be considered.

In this condition, when the acceleration switch 8 is closed, the capacitor 11e starts discharging by way of the resistors 11c and 11d, thus having its voltage decreased gradually. This discharge voltage is subject to the impedance-transformation (impedance-matching) by the operational amplifier 11g, which is outputted as the reference voltage value. The dropping characteristic of this voltage is shown by the curve "c" in FIG. 3.

When the discharge voltage from the capacitor 11e becomes equal to the divided voltage at the node D between the resistors 11b, 11d for dividing the voltage from the source 11a, the capacitor 11e stops discharging. The then reference voltage value provided by the reference voltage generating unit 11 reaches level "d" in FIG. 3, which is determined as a lower limit for the reference voltage value.

When the acceleration switch 8 is then opened, the capacitor 11e restarts charging by way of the resistors 11b, 11c from the source 11a, thus increasing its voltage thereacross. This charge voltage is outputted as a reference voltage value from the operational amplifier 11g as in the discharging mode of operation. The then rising curve is shown by a curve "a" in FIG. 3.

When the charge voltage of the capacitor 11e increases to be equal to the divided potential of the resistors 11h and 11i which divide the voltage of the source 11a, in other words, the output voltage of the operational amplifier 11j, the charge current through the resistors 11b, 11c now diverts to flow into the operational amplifier 11j through the diode 11k, thus stopping the charging operation of the capacitor 11e.

At this time, the reference voltage reaches a "b" level shown in FIG. 3, at which the upper limit level of the reference voltage is determined. This upper limit value of the reference voltage is constantly outputted as the normal reference voltage from the unit 11. In this manner, there is established a reference voltage value curve including the rising and falling curves as well as the upper and lower limit curves.

In this control apparatus for the vehicular charging generator thus constructed, when the operation of the vehicle is shifted from the normal running mode to the acceleration mode, thereby to close the acceleration switch 8, the reference voltage for regulating the output voltage of the voltage regulator 3 drops gradually following the curve "c" of FIG. 3. According to this curve, which represents the reference voltage supplied to the voltage regulator 3, due to the operation of the voltage regulator 3 in controlling the current to the field winding 102 of the generator, the output voltage of the generator 1 caused to decrease gradually, thus decreasing gradually the source voltage to the battery and electric load of the vehicle.

At this stage, if the lighting device 9 is lit, the lighting device 9 will become gradually darker so that the driver cannot notice visually such a change in the intensity of illumination. Also, as the output voltage of the generator 1 drops gradually, the driving torque of the generator 1 will decrease accordingly.

This means that the load on the engine is gradually removed so that shocks due to the load fluctuation on the engine are eliminated, whereby the rotational speed of the engine is smoothly increased, thereby improving the acceleration performance of the vehicle.

Next, when the vehicle gets out of the acceleration mode and so the acceleration switch 8 is opened, the reference voltage to be supplied to the voltage regulator 3 increases following the curve "a" in FIG. 3, and then the output voltage of the generator 1 increases gradually so that the source voltage of the vehicle also increases.

At this stage, if the lighting device 9 is lit, it becomes brighter so gradually that the driver cannot notice visually such a change in the intensity of illumination.

Also, the driving torque of the generator 1 will increase gradually as opposed to the acceleration mode, so that such load fluctuation shocks are eliminated, thus affording a smooth revolution of the engine. In this manner, every time that the vehicle repeats such cycles of acceleration or non-acceleration, the control apparatus of the invention will properly follow the sequence of the control operations noted above.

Figure 4:
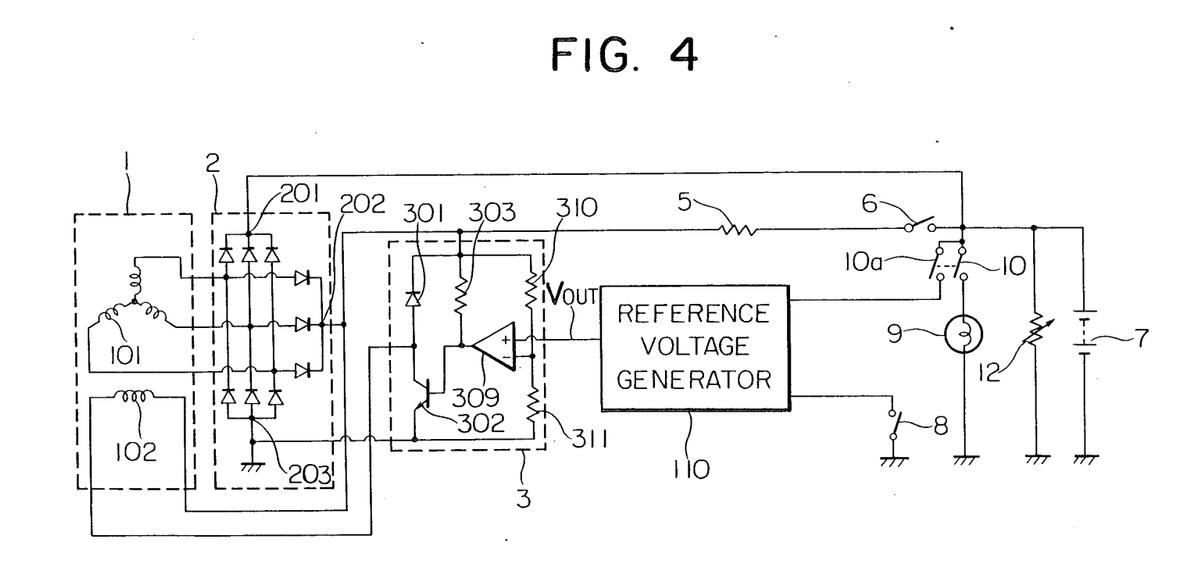
FIG. 4 is a circuit diagram showing another embodiment of a control apparatus for a vehicle battery charging generator according to the present invention.

FIG. 4 is a circuit diagram showing another embodiment of the invention, in which there are provided a reference voltage generating unit 110 which comprises a microcomputer, a switch 10a interlocked with the light switch 10 for the lighting device 9, and the acceleration switch 8 interlocked with an acceleration pedal, the both switches 10 and 10a being adapted to change over the operation mode. There is also shown another electric load designated by reference numeral 12.

With this construction, when the key switch 6 is closed, the reference voltage generating unit 110 is energized from a stabilized power source (not shown) so that the reference voltage generating unit 110 may generate a specific reference voltage for controlling the output voltage of the generator 1 to a specified level as noted hereinbefore.

Figure 5:
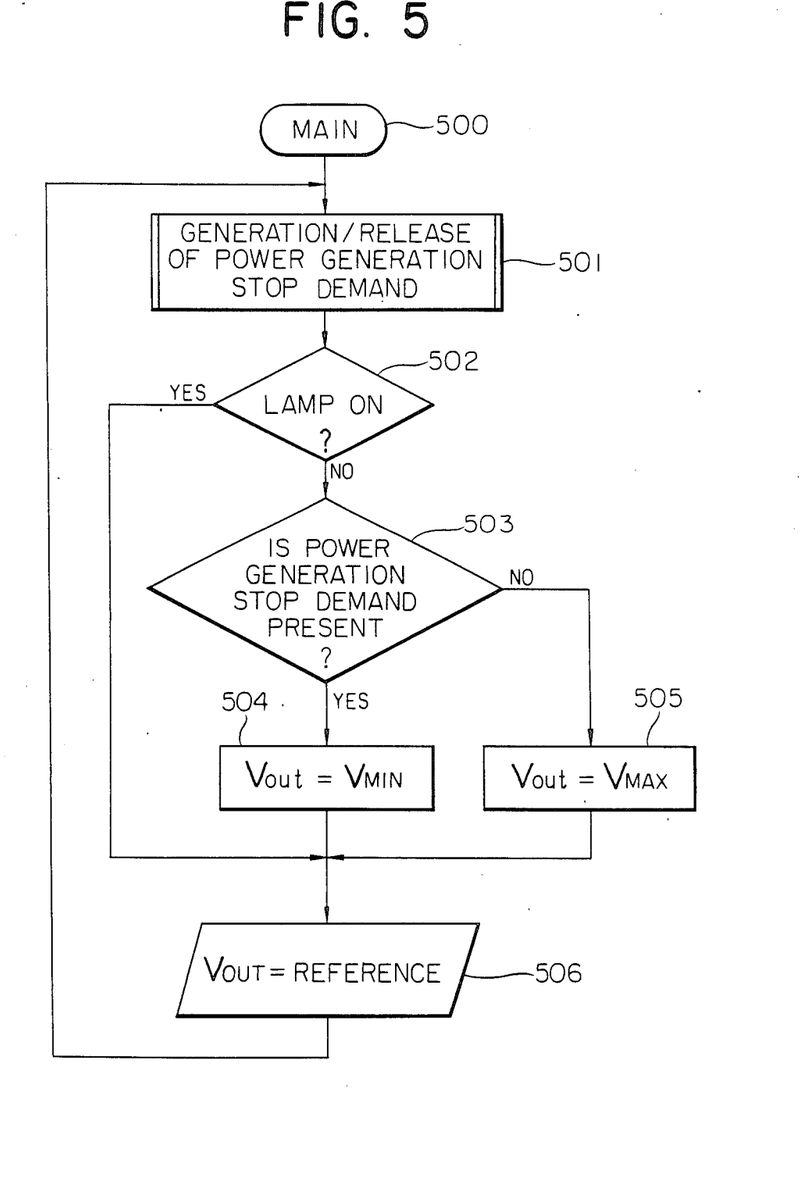
FIGS. 5 and 6 are flow charts showing a main program for the operation of the control apparatus shown in FIG. 4 and showing a timer routine for the control apparatus.
Figure 6:
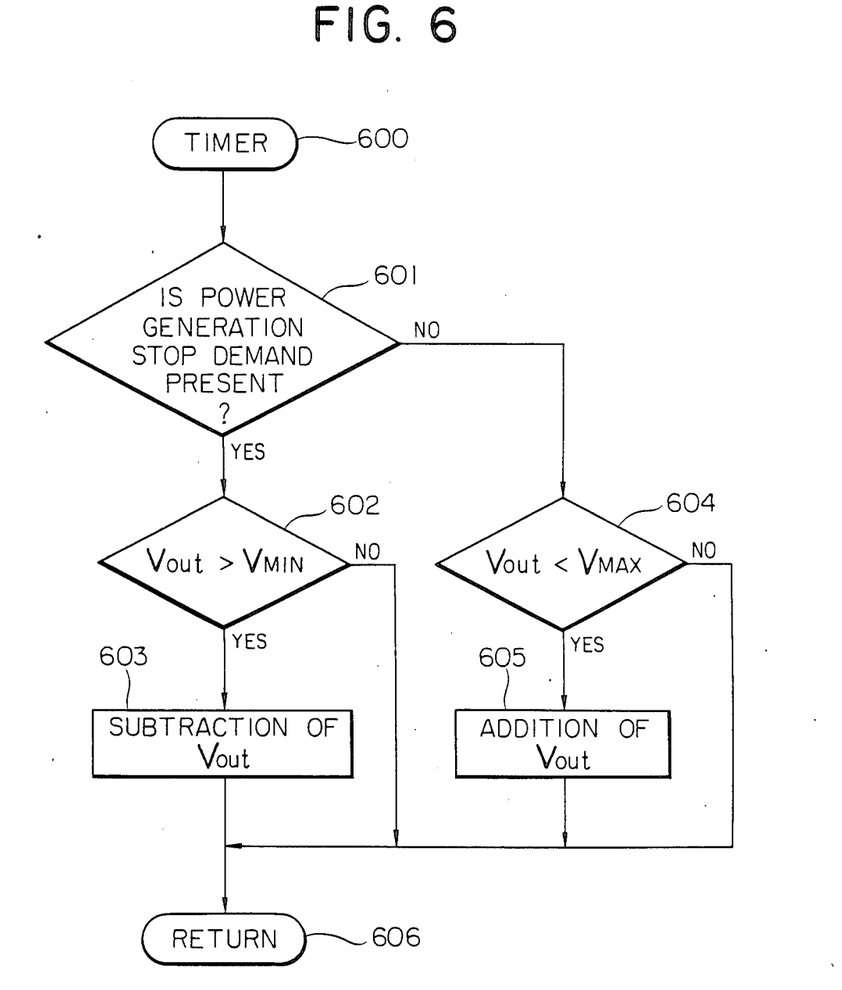

Next, the operation of the reference voltage generating unit 110 will now be described in conjunction with the flow charts shown in FIGS. 5 and 6. FIG. 5 shows the flow chart of the main program for operating the reference voltage generating unit 110. After the power is switched on, the main program starts executing in sequence and recycles the steps in loop. FIG. 6 shows a timer routine, which is repeatedly executed for a given interval as specified by an internal timer which is not shown but provided in the unit 110.

Reference is firstly made to the operation when the lighting device 9 is not lit. When the power is switched on, the main program is initialized at Step 500, after which the program proceeds to Step 501. At Step 501, from the status of the light switch 10, or whether or not the vehicle is in the acceleration mode, it is determined whether the power generating operation should be stopped or not.

At Step 502, whether the lighting device 9 is lit or not is checked. Now assuming that the lighting device 9 is not lit, the program will go to Step 503. At this step, whether or not a demand for stopping the power generation which may be provided at Step 501 exists is checked. If there exists no demand for stopping the power generation, by assuming $V_{OUT}=V_{MAX}$ at Step 505, $V_{OUT}$ is outputted as the reference voltage to the voltage regulator 3 at Step 506. It is to be noted that $V_{MAX}$ is a reference voltage for providing a regulated voltage from the generator 1 in the normal power generation state as noted with reference to FIGS. 2 and 3. Then, the program returns to Step 501. Should there exist a demand for stopping the power generation at Step 503, by assuming $V_{OUT}=V_{MIN}$ at Step 504, $V_{OUT}$ is outputted at Step 506 as in the above. At this stage, if $V_{MIN}$ is preset to such a reference voltage that the regulated output voltage of the generator 1 is lower than the terminal voltage of the battery 7, the generator 1 stops the generating operation. Accordingly, the circuits, including the microcomputer illustrated in FIG. 4, similar to the circuits of FIG. 2, are effective for connecting the output voltage of the generator 1 across the lighting device 9 while the generator output voltage remains below the terminal voltage of the battery 7 during a period of acceleration and the battery terminal voltage remains across the lighting device 9 to provide the power to light the device.

Next, reference is made to the operation of the control apparatus while the lighting device 9 is lit. When the light switch 10 is closed to light the lighting device 9, as the switch 10a is interlocked with the switch 10, these switches ae closed together, whereby the reference voltage generating unit 110 is informed of the fact that the lighting device 9 is lighting. Then, as the program jumps from Step 502 to Step 506, there is made no change in the reference voltage $V_{OUT}$ in the main program shown in FIG. 5, but if the timer shown in FIG. 6 is started by the interval timer, $V_{OUT}$ may be changed in the following manner.

Assuming that $V_{OUT}=V_{MAX}$ and there exixts a demand for stopping the power generation at Step 501, the program checks whether or not this demand exists at Step 601 and proceeds to Step 602. At this step, $V_{OUT}$ is compared with $V_{MIN}$. If $V_{OUT}>V_{MIN}$, $V_{OUT}$ is subtracted at Step 603, and this routine ends.

In this manner, every time that the timer routine is started, $V_{OUT}$ is substracted gradually, and then if $V_{OUT} \leq V_{MIN}$, the program will skip from Step 602 over to Step 606 so as not to decrease $V_{OUT}$ any more.

As reviewed hereinbefore, while $V_{OUT}$ is not changed in the main program, $V_{OUT}$ is decreased gradually according to the timer routine, so that the reference voltage $V_{OUT}$ as outputted at Step 506 will decrease gradually. Thus the output voltage of the generator 1 is decreased accordingly, so that the intensity of illumination of the lighting device 9 changes gradually.

When the demand for stopping the power generation is released, the program proceeds from Step 601 to Step 604, at which if $V_{OUT}<V_{MAX}$, $V_{OUT}$ is added gradually at Step 605, and the reference voltage will then increase gradually. Thus the output voltage of the generator 1 is increased accordingly, so that the intensity of illumination of the lighting device 9 changes gradually. When $V_{OUT}$ reaches $V_{MAX}$, the program proceeds from Step 604 to Step 606 so as not to increase $V_{OUT}$ any more.

It is to be noted that while the timer routine is still held in operation by the interval timer, even when the lighting device 9 is not lit, $V_{OUT}$ is set at once to $V_{MIN}$ or $V_{MAX}$ at Step 504 or Step 505, so that in the timer routine, the program will skip to Step 606 through the checking operations at Step 602 or 604 without executing Step 603 or Step 605, and consequently, the timer routine has no effect on the setting of $V_{OUT}$.

As is noted hereinbefore, while the lighting device 9 is lit, the intensity of illumination of the lighting device 9 can be changed gradually by gradually changing the output voltage of the generator 1 so that no one can notice visually such a change in the intensity of illumination of the lighting device 9.

It has been described in the above preferred embodiment of the invention that the acceleration state of the vehicle is detected by means of the switch 8 to determine whether the power generating operation is required or not. On the other hand, there is a case where the loads on the engine are required to be reduced to stably operate the engine when the rotational speed of the engine is abnormally low. In this case, there may be provided a switch workable with a speed sensor in place of the accelerating switch 8, which effects all the equivalent functions. Moreover, even in the case where the other load 12 is fluctuated, the voltage across the output terminals of the battery 7 may be detected for responding to such a fluctuation.

As described hereinbefore, the present invention provides the advantageous effect that by virtue of an effective control for a voltage regulator in such a manner that the output voltage of the generator of a vehicle may be changed gradually by using a reference voltage generating unit while a lighting device is on, the output from the generator may be decreased to reduce the driving torque on the engine in response to a demand for stopping the power generation while controlling the intensity of illumination of the lighting device so that a change in the lighting intensity thereof is not noticeable.

While the present invention has been described in detail by way of specific preferred embodiments thereof, it is to be understood that the present invention is not intended to be restricted to the details of the specific construction shown in the preferred embodiments, but to contrary, the present invention can of course be practiced in many other arrangement to an equal advantageous effect in accordance with the foregoing teachings without any restriction thereto and without departing from the spirit and scope of the invention.

It is also to be understood that the appended claims are intended to cover all of such generic and specific features particular to the invention as disclosed herein and all statements relating to the scope of the invention, which as a matter of language might be said to fall thereunder.

What is claimed is:

1. A control apparatus for a vehicle generator means having an output voltage connected to a battery having a terminal voltage and an electric load connected across said generator means output voltage and said battery terminal voltage, said control apparatus comprising, in combination:
   voltage regulating means for controlling the output voltage of said generator means to a predetermined regulated value in accordance with a reference voltage value;
   coupling means providing a signal representing an operating state;
   reference voltage generating means for producing a substantially uniform reference voltage value supplied to said voltage regulating means in the absence of the signal from said coupling means, and for producing a gradually decreasing reference voltage value in response to the signal from said coupling means for gradually decreasing the output voltage of said generator means upon the occurrence of the operating state from a higher regulated value to a value less than the battery terminal voltage value; and
   circuit means connecting the output voltage of said generator means across the electric load while the generator means output voltage value remains below the battery terminal voltage value and the battery terminal voltage remains across the electric load to provide power to the load.

2. A control apparatus for a vehicle generating means as claimed in claim 1 wherein the signal from said coupling means is provided by an aceleration switch connected to said coupling means for detecting an acceleration operating state of the vehicle, said reference voltage value being changed gradually upon operation of said acceleration switch.

3. A control apparatus for a vehicle generator means as claimed in claim 2 wherein said reference voltage generating means comprises a comparator, a voltage dividing circuit having a pair of resistors connected to a node and adapted to set a reference voltage for said comparator, and a capacitor connected to said voltage dividing circuit, said node between the resistors of said voltage dividing circuit being grounded through a resistor and said acceleration switch and circuit means.

4. A control apparatus for a vehicle generator means as claimed in claim 1 wherein said reference voltage generator means comprises a microcomputer means operable under program control in response to signals from said coupling means for gradually decreasing the reference voltage value upon the occurrence of the operating state to gradually decrease the generator means output voltage and for gradually increasing the reference voltage value to gradually increase the generator means output voltage after the termination of the operating state.

5. A control apparatus for a vehicle generator means as claimed in claim 4, further comprising a first detection means connected to said coupling means for detecting a lighting state of the electrical load and generating a signal representative thereof and a second detection means connected to said coupling means for detecting the operating state and producing the signal representative thereof, said reference voltage being changed gradually by said reference voltage generating means in response to at least one of said first and second detection means signals from said coupling means.

6. A control apparatus for a vehicle generator means as claimed in claim 1 wherein said reference voltage generating means in response to signals from said coupling means includes means for gradually increasing the reference voltage value to gradually increase the generator means output voltage after the termination of the operating state.

* * * * *